G. L. BENDER & J. G. RAPP.
LABELING MACHINE.
APPLICATION FILED NOV. 20, 1911.
1,091,793.
Patented Mar. 31, 1914.
11 SHEETS—SHEET 11.
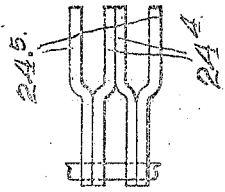
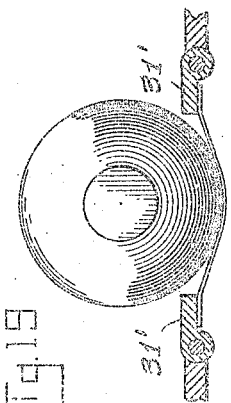
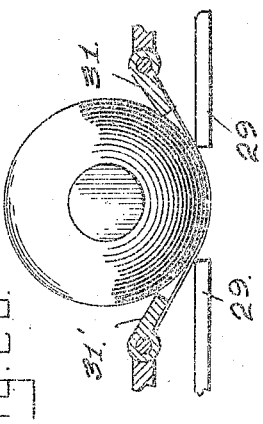
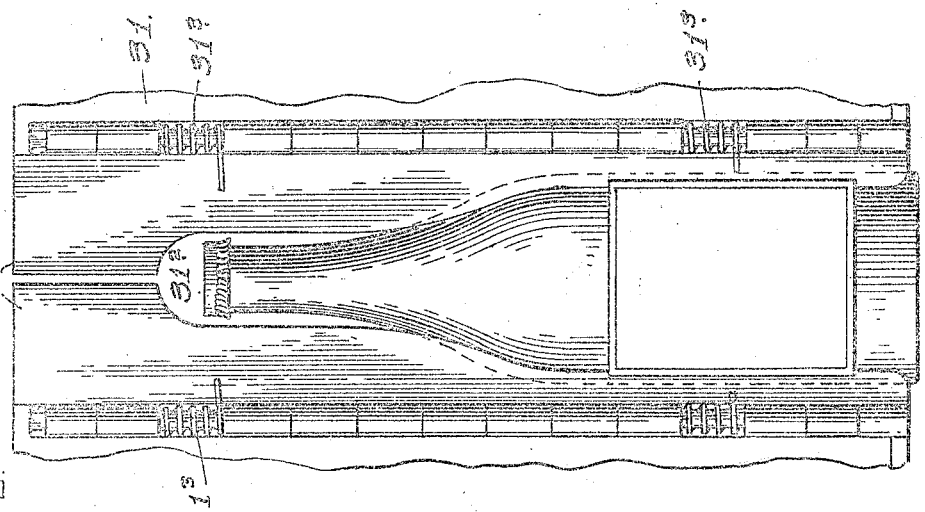

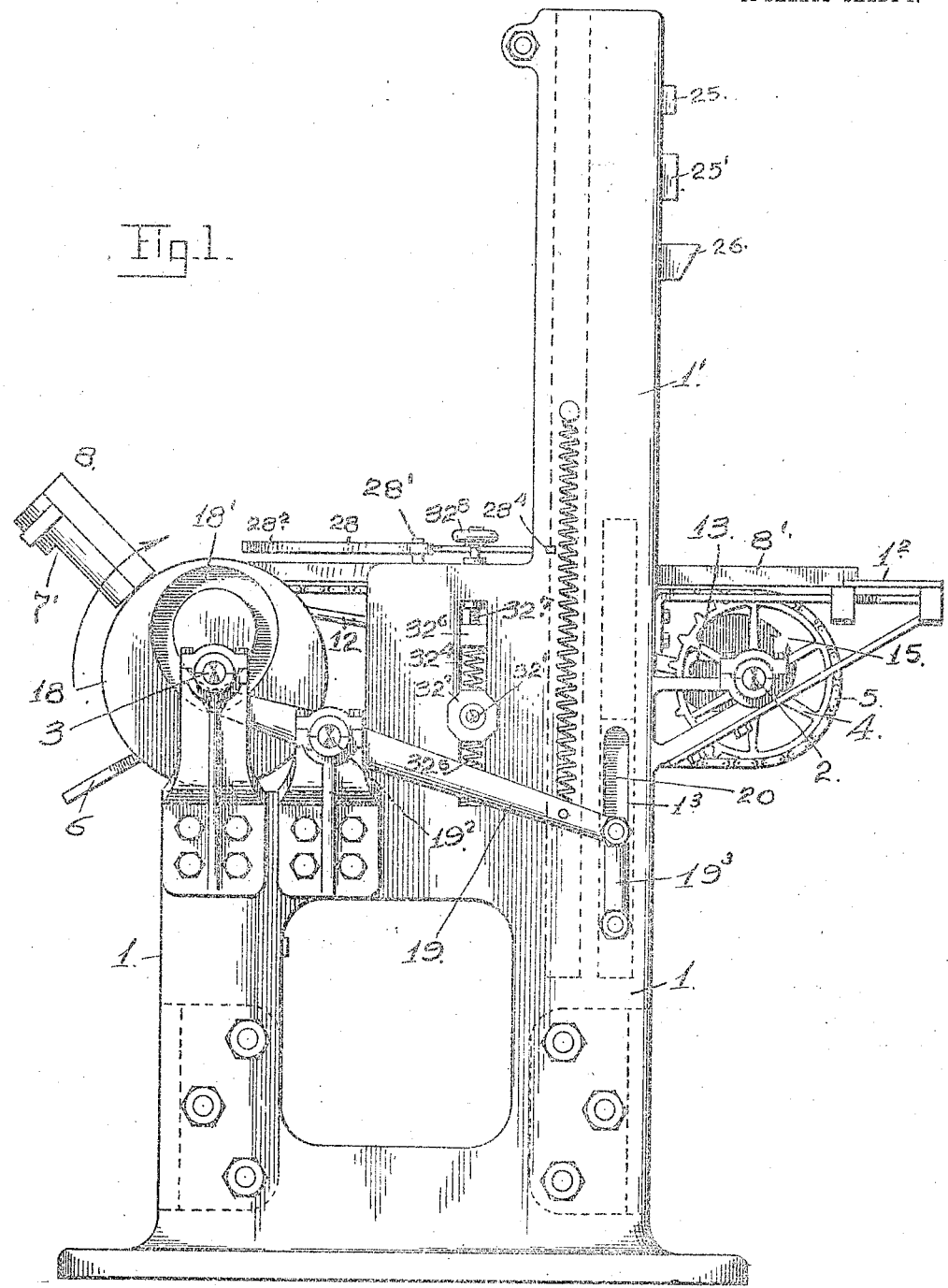

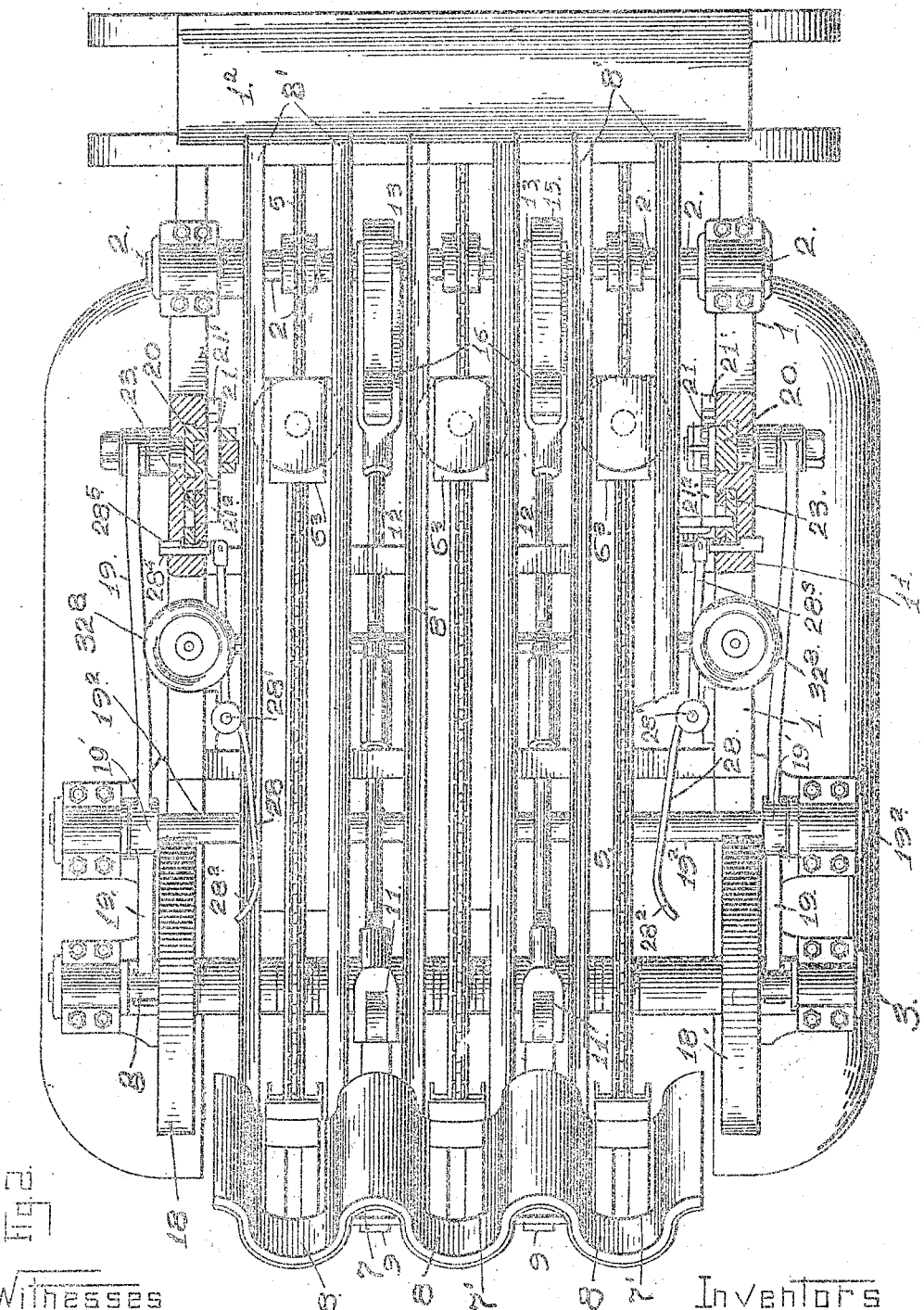

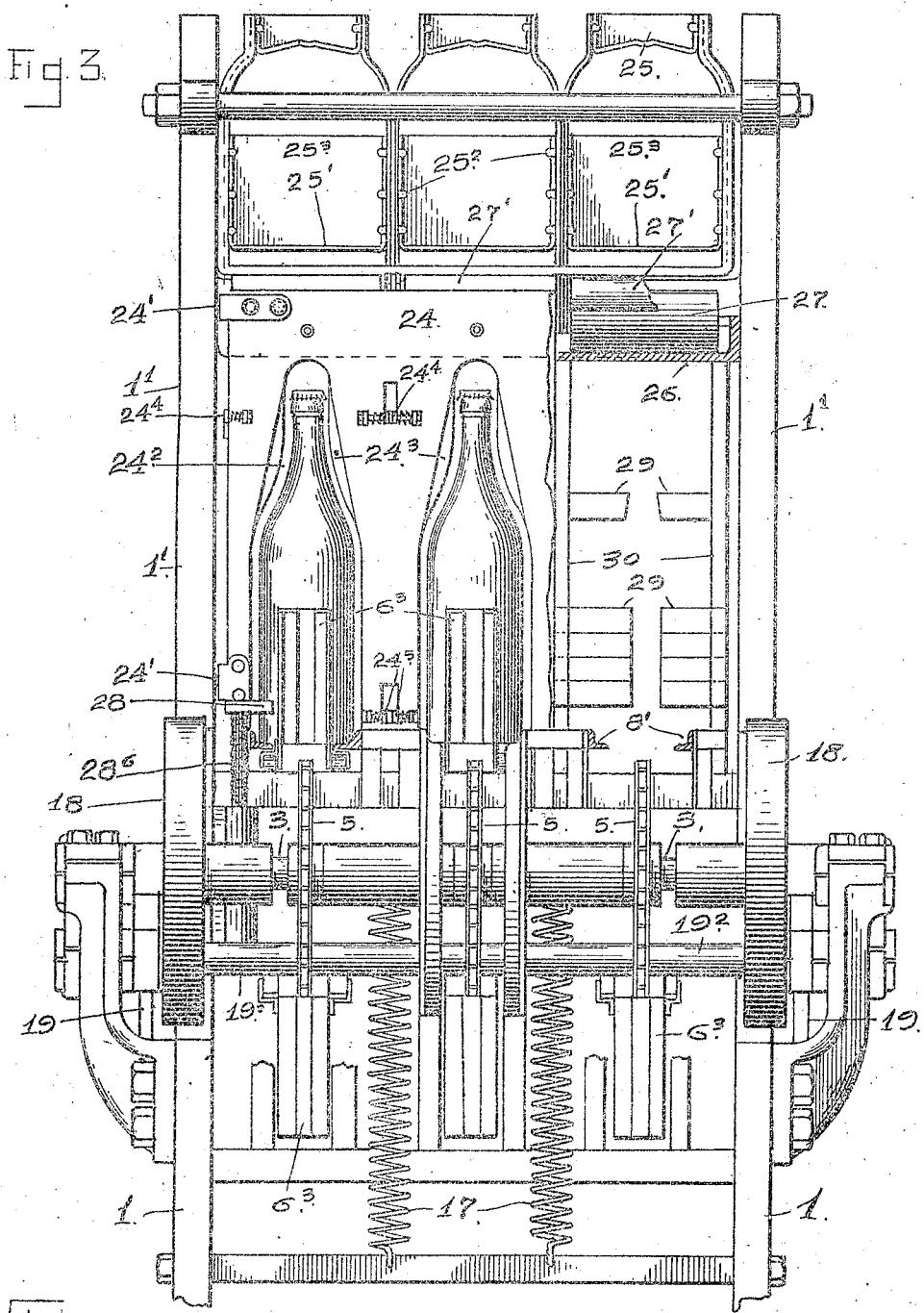

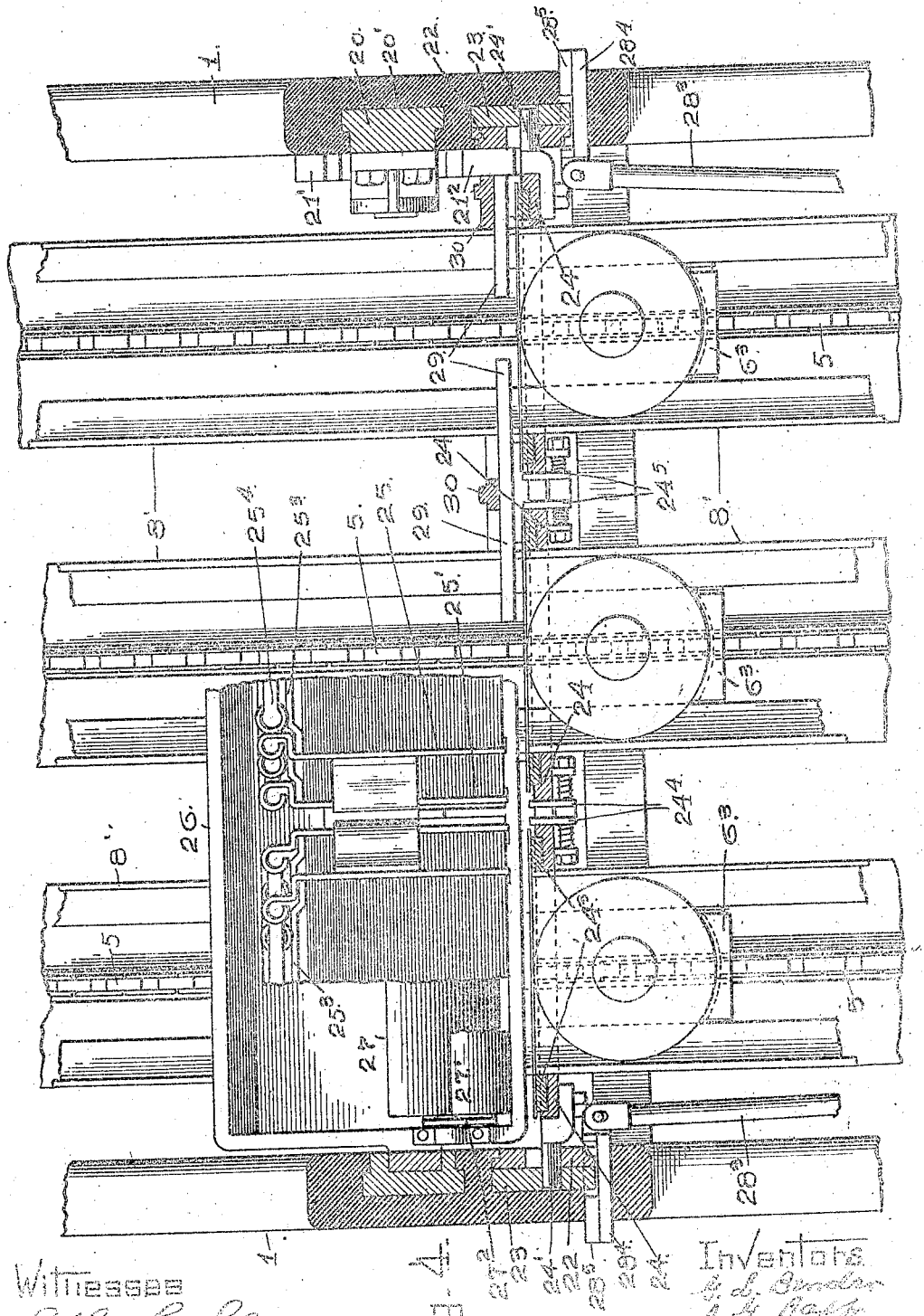

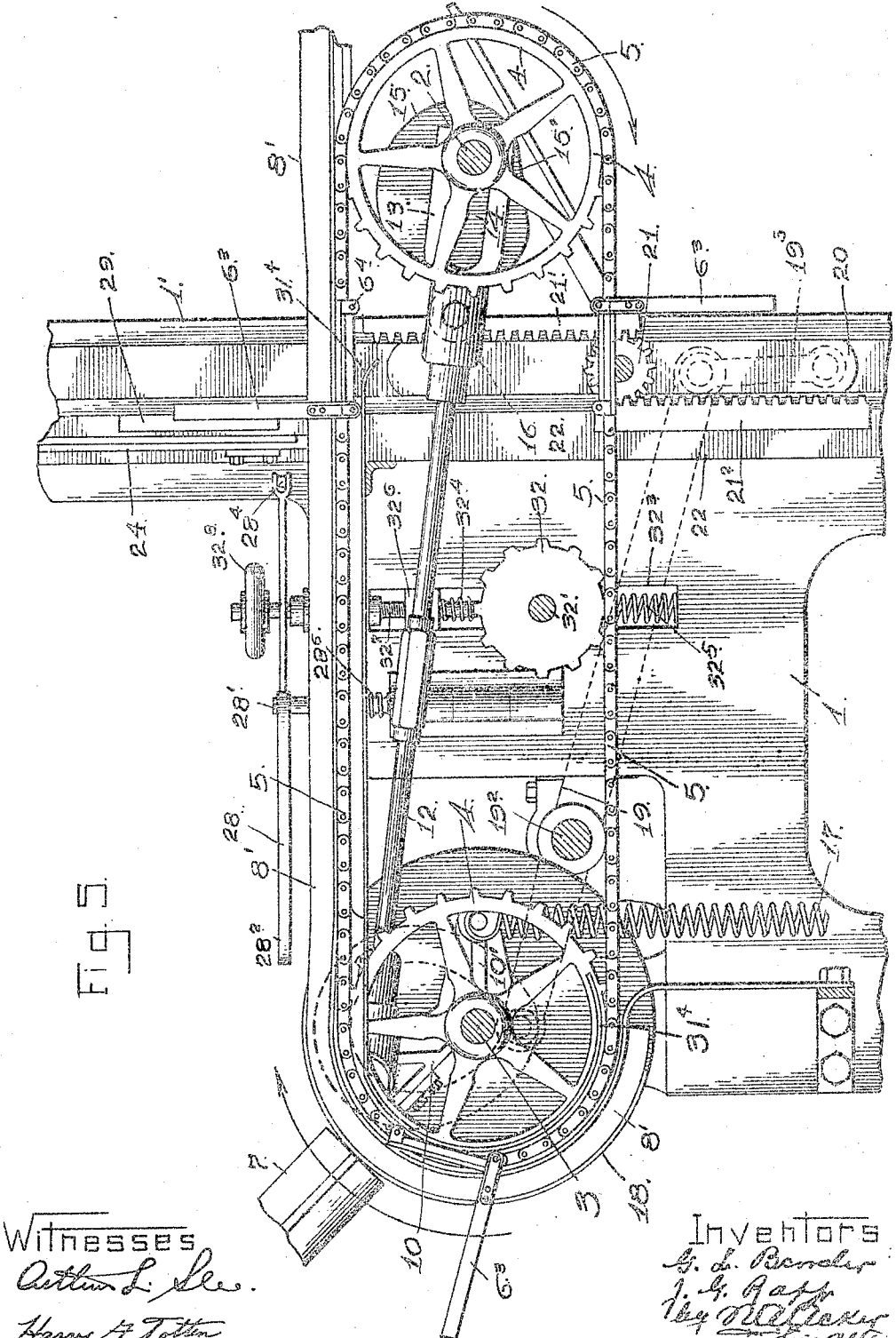

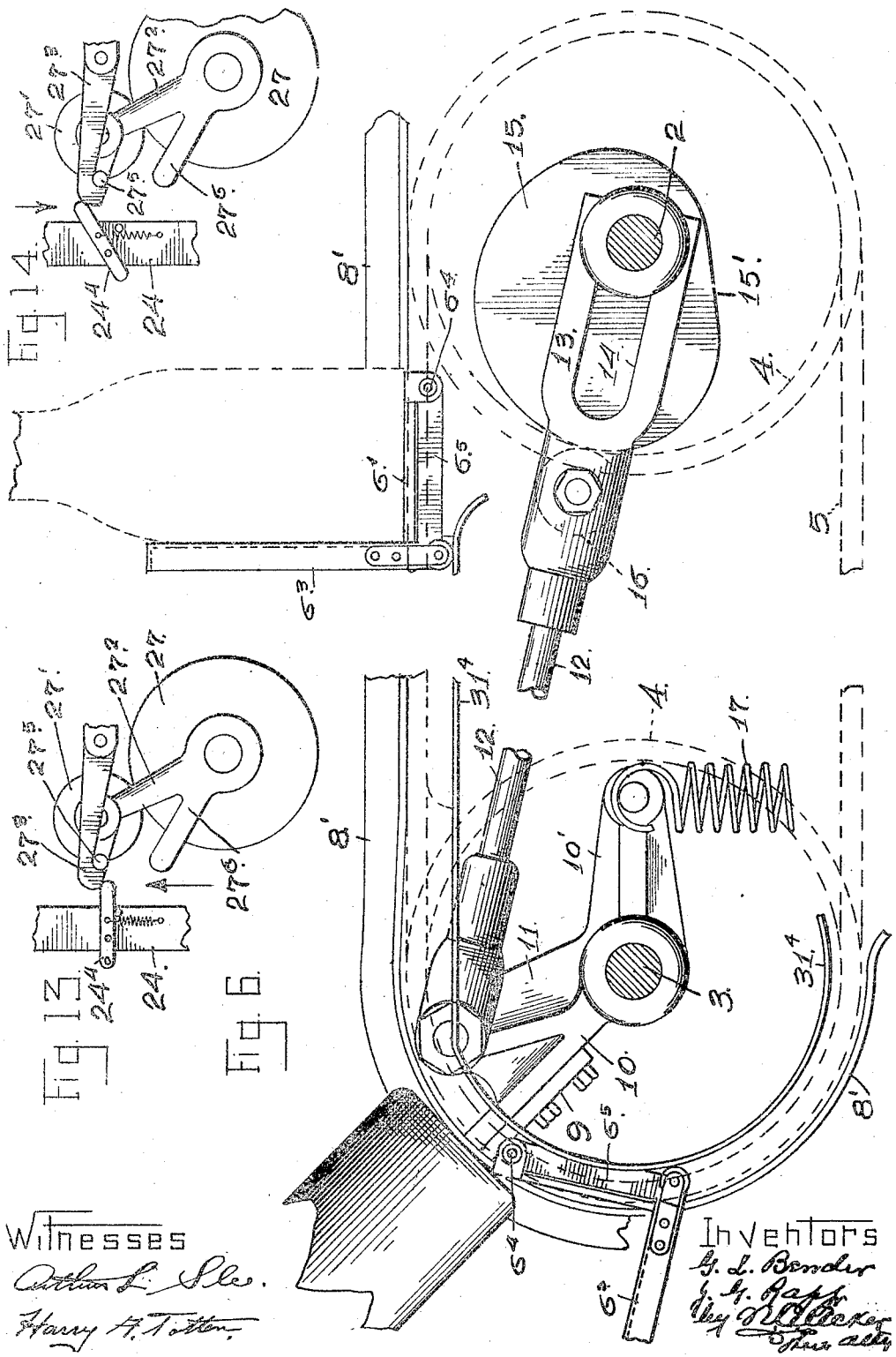

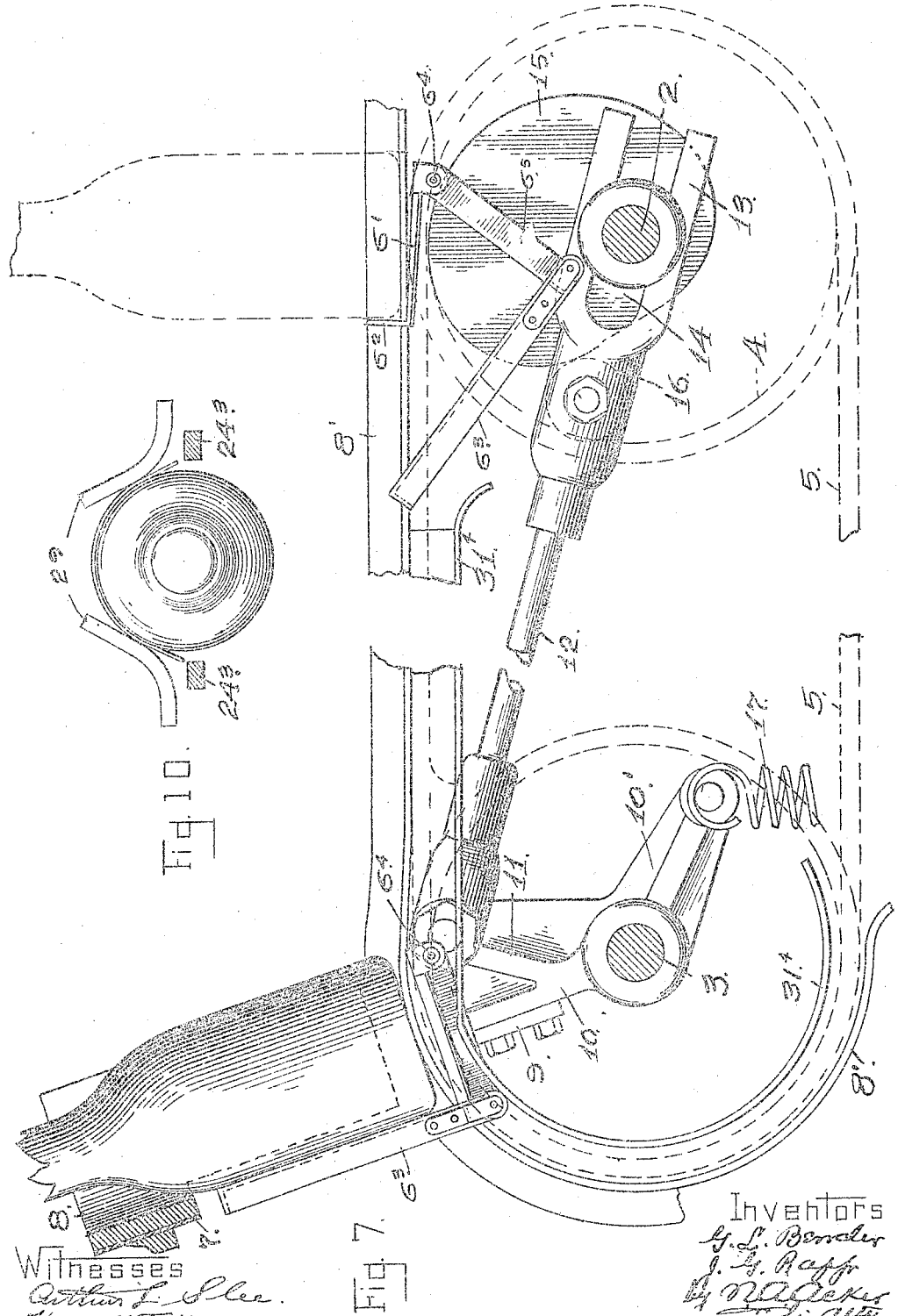

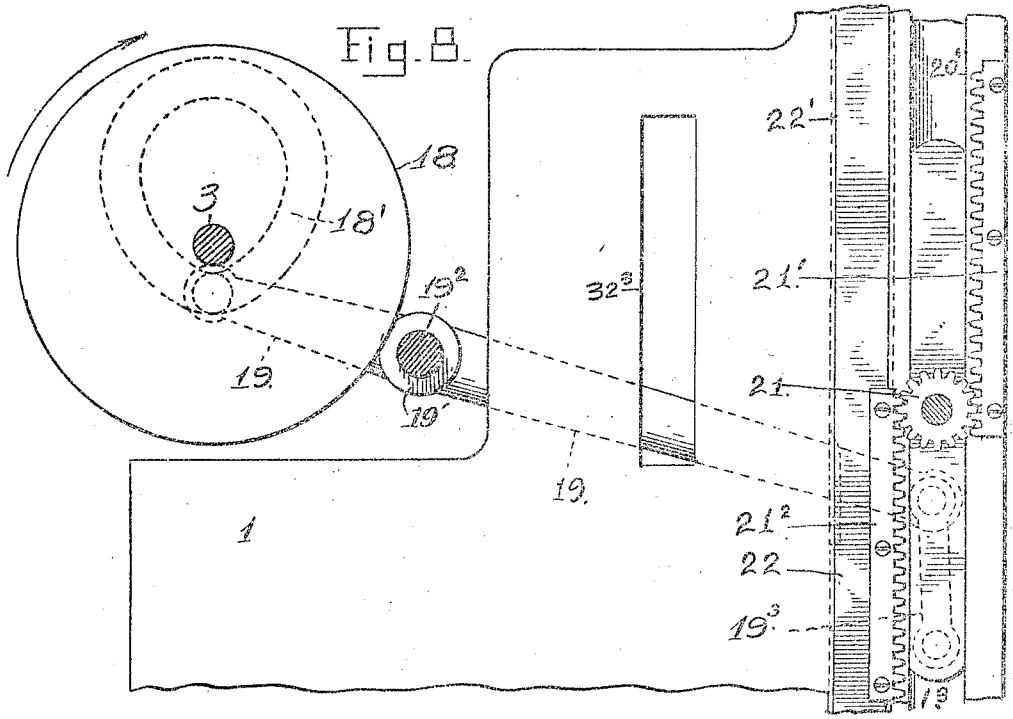
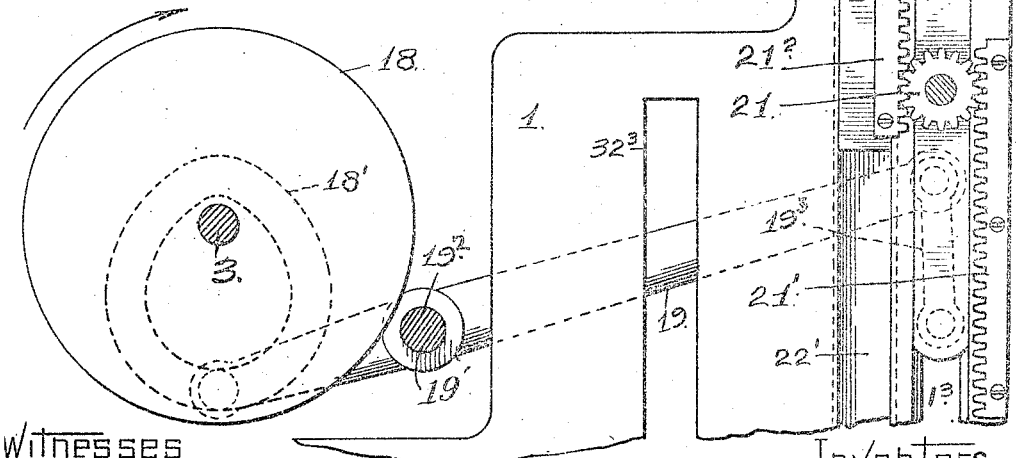

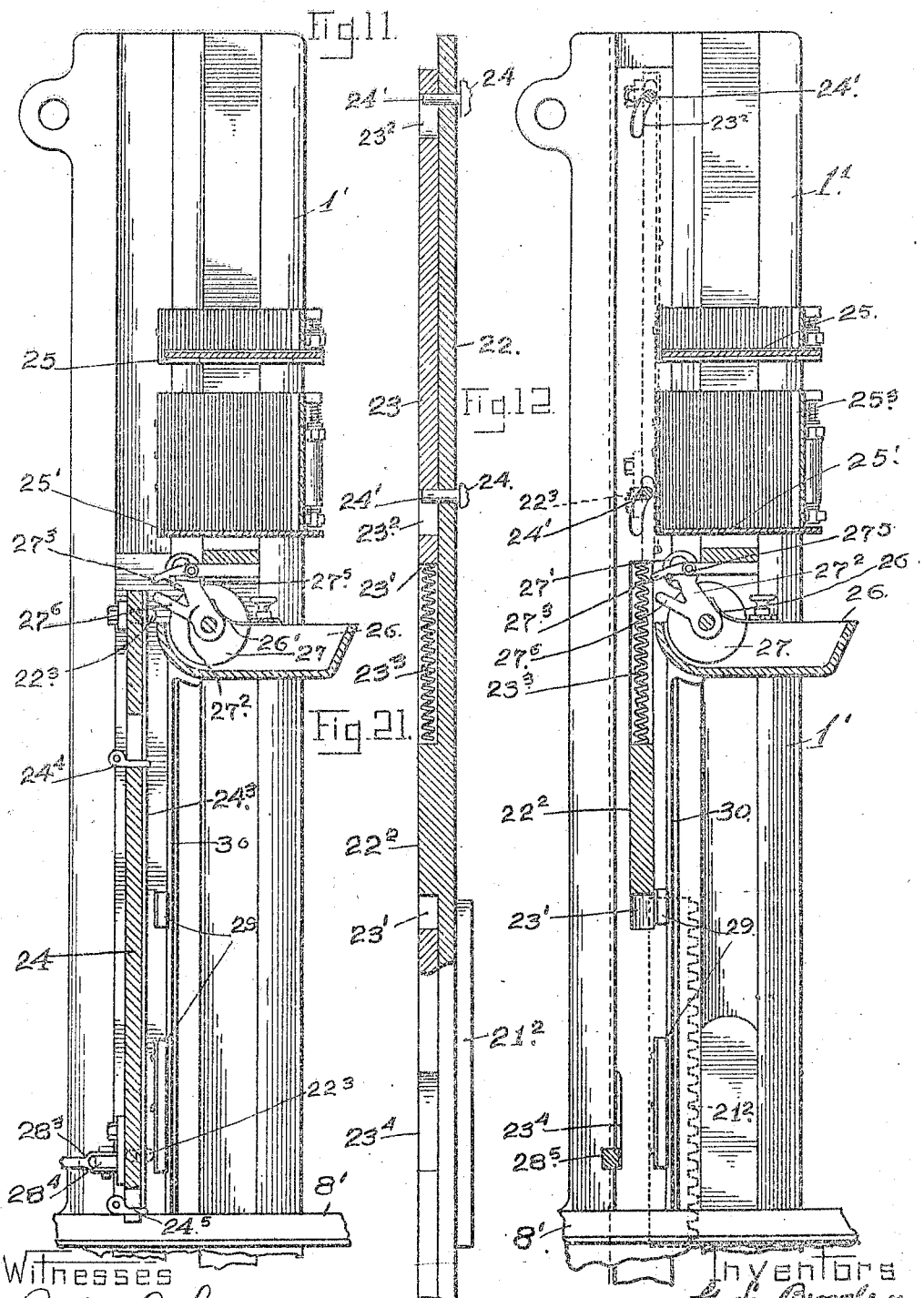

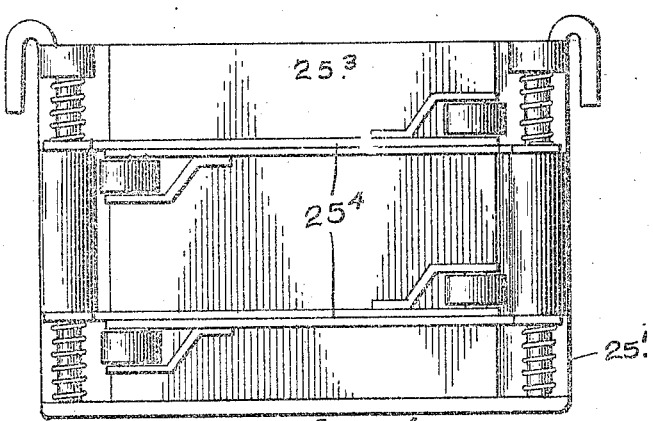
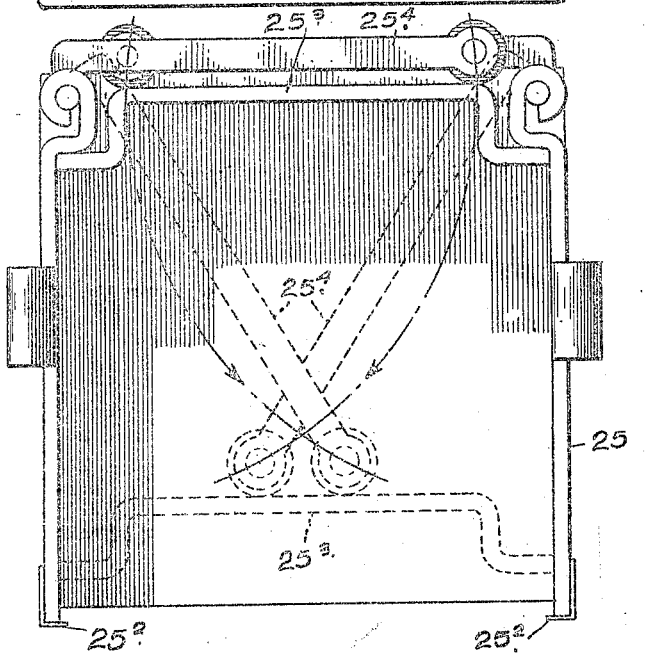
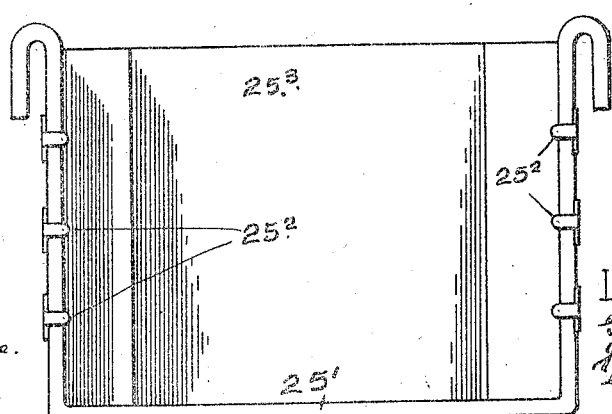

UNITED STATES PATENT OFFICE.

GEORGE L. BENDER AND JOHN G. RAPP, OF SAN FRANCISCO, CALIFORNIA.

LABELING-MACHINE.

1,091,793.   Specification of Letters Patent.   Patented Mar. 31, 1914.

Application filed November 30, 1911. Serial No. 861,259.

*To all whom it may concern:*

Be it known that we, GEORGE L. BENDER and JOHN G. RAPP, citizens of the United States, residing in the city and county of San Francisco and State of California, have invented certain new and useful Improvements in Labeling-Machines, of which the following is a specification.

The hereinafter described invention relates to an improved apparatus for applying labels to filled bottles, although its use is not restricted to the labeling of bottles, and the same comprises one or more endless conveying chains, each provided with a plurality of carriers for sustaining the bottles delivered thereto by a feed device, means for imparting motion to the feeding device for operating it in the direction of the travel of the conveying chains and carriers, means for placing the labels in the path of the propelled bottles, devices for applying an adhesive to the surface of the labels, wipers for smoothing out the labels and pressing the same to the surface of the bottle, a label container and a mechanism for applying an adhesive to the surface of a label picker during its movement in the direction of the label containers, the said picker being adapted to remove a label from the container and place the same within the path of the propelled bottle.

The construction of the co-acting working parts is such that the label picker for placing the label in the path of the propelled bottle, is not supplied with a label unless a bottle is positioned on the carrier and conveyed toward the labeling mechanism; hence in the operation of the apparatus if a bottle is not conveyed toward the labeling mechanism, the mechanism for forcing the adhesively coated label pickers against the label receptacles is not thrown into operation, consequently, no bottle, no label feed.

The object of the invention is to render automatically the work of applying labels to filled bottles, to materially expedite the work of labeling the bottles, and by doing so materially increasing the output of the labeling plant and correspondingly reducing the cost of labeling the bottles, and to provide against the feeding of labels in case no bottle is presented for labeling, thereby providing against the waste of material and delay in the operation of the apparatus.

With these and other objects in view, the invention consists in the construction and novel combination of parts hereinafter fully described, illustrated in the accompanying drawings, forming a part of this invention, and pointed out in the claims hereto appended; it being understood that various changes in the form, proportion, size and minor details of construction within the scope of the claims may be resorted to without departing from the spirit or sacrificing any of the advantages of the invention.

To comprehend the invention reference should be had to the accompanying sheets of drawings illustrating a completely constructed apparatus for successively carrying out the invention—wherein—

Figure 1 is a side elevation of the machine disclosing a bottle feeding device, a part of the endless conveying chain, the mechanism for elevating the label picker, the adhesive receptacle and the label boxes. Fig. 2 is a plan view of the machine with the labeling mechanism removed, disclosing the slides for operating the same in section, the bottle feeding device and the mechanism for swinging the same in an arcuate path, the endless conveyer chain with the bottle supporting tracks on either side thereof, and the pivoted levers in the path of the travel of the bottle to be operated by the same for controlling the no bottle no label feed device. Fig. 3 is a front end elevation with the feeding device removed and the label pickers partly broken away, disclosing one set of the label wipers behind them, also the neck and body label boxes, one above the other with the adhesive receptacle partly broken away, showing the adhesive feed and applying rollers, the endless conveyer chains, the bottle carriers secured thereto, and the bottle supporting tracks. Fig. 4 is a broken sectional plan view of the neck and body label boxes, the adhesive receptacle and adhesive feeding and applying roller, the label pickers, label picker carriage, the pins that support the label picker carriage and the slides that operate the same, the pin that controls the "no bottle no label" device, the label wipers and the endless conveyer chains. Fig. 5 is a broken vertical sectional view taken through the center of the machine, the top and lower portions of the machine being broken away and the driving and operating mechanism being shown together with the endless conveyer chain and the bottle carriers. Fig. 6 is a broken side view of the feeding mechanism showing one of the bottle carriers, secured to the endless conveyer chain and about to engage the bottle in the pocket of the feeding device, another carrier being shown just before the bottle sustaining back thereof which is supported in a vertical position by the track section reaches the end of the section and drops into an inclined position, and the cam and connecting rod for transmitting motion to the bottle feeding device. Fig. 7 is a similar view of that of Fig. 6, showing one of the bottle carriers taking the bottle from the feeding device, another carrier just after having passed the end of the supporting track section, allowing the bottle sustaining back to drop from behind the bottle and the position of the cam operating device and connecting rod attached to the feeding device during this portion of the feeding operation. Fig. 8 is a broken side elevation of the mechanism for imparting to the label pickers a reciprocating movement, showing the cam, the pivoted arm operated thereby, the reciprocating pinion and rack and the stationary rack, the parts being in their lowermost position. Fig. 9 is a similar view to that disclosed in Fig. 8, but with the parts in their uppermost position. Fig. 10—(Sheet 7 of the drawings) is a sectional detail view in plan of a bottle passing through the label pickers and wipers after having received the label. Fig. 11 is a vertical sectional view of the labeling mechanism showing the label picker in its lowermost position in the path of the bottle, the adhesive receptacle, the adhesive feeding and applying rollers, the applying roller being held up away from the face of the label picker, the pawls carried by the label picker for releasing the applying roll and for restoring it to its normal position, and the upper and lower label receptacles. Fig. 12 is a similar view with the label picker frame in its upper position with the label pickers shown in dotted lines, the adhesive applying roll in its normal position after having coated the label pickers with an adhesive, the neck and body label boxes and the slides having the offset slots for forcing the pickers against the label boxes. Fig. 13—(Sheet 6 of the drawings) is a detailed view of the pawl on the label pickers about to release the adhesive feed roller on its upward stroke. Fig. 14—(Sheet 6 of the drawings) is a similar view to that of Fig. 13, showing the pawl passing over the adhesive feed roller catch on the downward stroke of the label pickers. Fig. 15 is a rear view of one of the label boxes, showing the pivotally mounted spring pressed arms, for forcing the movable back of the label containing boxes together with the labels forwardly toward the retaining fingers. Fig. 16 is a plan view of Fig. 15 showing the pivotally mounted spring pressed arms in position when the label containing box is filled with labels and the arms shown in dotted lines when the box is nearly empty of labels. Fig. 17 is a front view of the label containing box showing the label retaining fingers. Fig. 18 is a modified form of label picker, adapted for use when the label to be affixed is shorter than the diameter of the bottle. Fig. 19 is a sectional view in plan of Fig. 18, showing the bottle engaging the label and about to engage the label pickers. Fig. 20 is a view similar to Fig. 19, showing the bottle a little more advanced, engaging the label pickers and about to pass through the label wipers. Fig. 21—(Sheet 9 of the drawings) is a vertical sectional view of the reciprocating slides (in the same position as in Fig. 12), that operate the label picker carriage and the pin for retaining the slide with the offset slots. Fig. 22 is a plan view of the adhesive roller releasing and restoring pawls carried by the label picker carriage.

The machine disclosed in the drawings is capable of labeling from one to three bottles at one operation, but it is to be understood that this is merely for illustration as it is intended that the machine may be constructed as a single or multiple bottle labeling machine.

In the drawings, referring more particularly to Figs. 1, 2 and 5 thereof, the numeral 1 designates a suitable supporting frame which is adapted to carry the bottle feed and drive mechanisms, and is provided at one end with a pair of oppositely spaced vertically extending upright portions or arms 1' which are adapted to carry the label affixing and applying mechanisms. Mounted in journals at the rear of the frame 1 and below the arms 1' is a drive shaft 2 adapted to be operated by power received from any suitable source, and to transmit the same to a driven shaft 3, mounted in journals at the front of the frame by means of spaced alined sprocket wheels 4, rigidly mounted on their respective shafts 2 and 3, the sprockets being connected by suitable linked chains 5, hereinafter called the conveyer chains which also convey the bottles to be labeled from the feeding mechanism through the label applying mechanism and onto a table $1^2$ or other suitable form of receiver for the filled bottles located at the rear of the machine.

The conveyer chains 5 are provided at suitable spaced points with bottle carriers 6 adapted to travel with the chain in the direction of the arrow in Fig. 1, and to pass through openings 7' in the lower edge of the rubber lined pockets 8 of the oscillating bottle feed device 7, during its upward movement and to convey the bottles along the parallel spaced L-shaped tracks 8', arranged at either side of the chain 5, to the labeling mechanism and thence to table 1² at the rear of the machine. The terms "inner or front" of the machine refer to that part adjacent or facing the bottle feed end of the machine, and the terms "outer or rear" refer to that part adjacent or facing the bottle delivery end of the machine.

The bottles to be labeled are placed either automatically or by hand in pockets 8 of the oscillating feed plate 7, shown particularly in Figs. 2 and 6 of the drawings, which is connected at its lower edge to arms 9 of the supporting members 10 journaled on the drive shaft 3. Fulcrumed to a branch 11 of the supporting arms 9, adjacent the feed plate 7 are adjustable connecting rods 12, provided at their outer ends with yokes 13, the sides of which are slotted as at 14 and receive the drive shaft 2 on either side of cam members 15, carried by the shaft 2. The yokes 13 are provided at their apex with loosely journaled friction reducing wheels 16, adapted to be held in contact with the periphery of the cam members 15, by means of tension springs 17, the lower ends of which are connected to the frame of the machine and the upper ends to arms 10' of the supporting members 10. The face of the cam blocks 15 are provided with substantially flat edges as at 15' and from this construction it will be readily seen that the cam blocks rotating in the direction of the arrow—Figs. 1 and 5 of the drawings—will by means of the connecting rods 12 force the feed plate 6 slowly backward in an arcuate path until it reaches an angle of about 45 degrees at which point the bottles are placed in the pockets 8, and as the flat faces 15' approach the friction reducing wheels 16, the springs 17 which at all times keep the wheels 16 and blocks 15 into engagement with each other, will impart a pull to the supporting members 10, and the plate 7 will be given a constantly accelerated movement forward until the bottles are in a substantially upright position, when the carriers 6 which are so spaced on the conveyer chain 5 as to only present themselves when the bottles are in this upright position, will pass through the openings 7' in the pockets 8, remove the bottles therefrom without injury, as the feed plate and the carriers are at this time traveling at approximately the same speed, and as the cam wheels present the rounded surface immediately in rear of the flat face 15', the backward movement of the feed plate 6 will again begin.

The bottles after being fed into the machine are carried by the endless conveyer chains through the label applying mechanism, shown more fully in Figs. 1, 3, 4, 5, 8, and 9, of the drawings, and which is operated in the following manner: Mounted on each end of the driven shaft 3 so as to rotate therewith are circular disks 18 provided in their outer faces with cam slots 18', adapted to receive studs on the inner ends of arms 19, fulcrumed near their inner ends as at points 19' to a transverse shaft 19² carried by the main frame 1. The arms 19 are pivotally connected at their outer or longest portions, to links 19³ which are in turn pivotally connected through vertical slots 1³ in the main frame to slides 20, mounted in the vertical slots 20' in the inner sides of the upright portions 1' of the frame 1.

The disks 18 rotating in the direction of the arrow—Figs. 8 and 9 of the drawings—transmit through the arms 19 a reciprocating movement to the slides 20, on which are mounted toothed pinions 21, meshing at one side thereof with stationary racks 21' secured to the frame of the machine, and at the other with corresponding racks 21² secured to slides 22 which are adapted to slide in vertical slots 22' adjacent the slots 20'. It will be observed that when motion is transmitted to the slides 20 carrying the pinions 21 which intermesh with the stationary racks 21' secured to the face of the machine, the stationary racks 21' will impart, by means of the pinions 21, twice the speed to the racks 21², and consequently the slides 22 to which the said racks are secured travel twice the distance of the pinions 21, as shown in Figs. 8 and 9 of the drawings. Slidably mounted in the slots 22' and positioned in rear of the slides 22 are other slides 23, provided at their rear edges and midway of their length with longitudinally extending cut out portions 23' adapted to receive lugs 22² extending from the inner face of the slides 22, the slots 22' being of such length as to permit the movement of the lugs therein. The slides 23 are further provided near their upper ends with forwardly inclined vertically extending curved slots 23², the lower ends of which are in register with horizontal slots 22³ in the upper ends of the slides 22. The registering slots 23² and 22³ are adapted to receive horizontally extending pins 24' extending from the sides of a label picker carriage 24 adjacent the top and bottom edges thereof. Thus it will be observed that when a reciprocatory movement is transmitted to the slides 22, the slides 23 being connected therewith by the pins 24' carried by the label picker carriage 24, the three parts will slide in unison. Interposed between the upper edge of the lugs 22' on the slides 22, and the upper face of the cut out portions 23' on the slides 23, are coiled springs 23³, the tension of which forces the lug 22² toward the bottom of the slot 23', causing the pins 24', by the action of the curved slots 23² in the slides 23 thereon to move toward the front of the horizontal slots 22³.

The label picker carriage—Figs. 3, 4, 11 and 12 of the drawings—comprises a plate 24 extending between the upright arms 1' of the frame and transverse to the path of the conveyer chains 5, and is provided in the path of the conveyer chains 5 with vertically extending bottle openings 24², open at the lower edge of the plate and of a size to admit the passage of a bottle therethrough. The openings 24² are adapted to have detachably secured adjacent the edges thereof and in rear of the plate 24, substantially inverted U-shaped plates 24³, hereinafter termed label pickers. Secured between the uprights 1' and located at or near the tops thereof and arranged in pairs, one above the other, directly above the conveyer chains 5, with their open sides toward the front of the machine, are neck and body label boxes 25 and 25', of a size adapted to contain respectively the neck and body labels to be applied to the bottles by the label pickers 24³. Secured to the uprights in the same manner as the label boxes and positioned below each pair of boxes are receptacles 26 adapted to contain an adhesive, and loosely mounted on transverse shafts journaled in the sides of the adhesive receptacles are adhesive applying rollers 27', mounted in the upper ends of arms 27², pivoted at their lower ends to each side of the adhesive feeding rollers 27. The rollers 27' are adapted to contact with and rotate about the axis of the feed rollers 27. The adhesive applying rollers 27' are normally held in a suspended position—Figs. 11, 12, 13 and 14 of the drawings—by pivoted catches 27³, secured to the uprights 1', which are adapted to engage pins 27⁵ projecting from the sides of the arms 27². Projecting from the underside of the arms 27² and in angular relation thereto, are short arms 27⁶ which bow slightly to one side of the arms 27² and are adapted to return the rollers 27' to their normal elevated positions after the same have been released therefrom, in a hereinafter described manner.

The label picker carriage 24 is provided at its outer edges and midway between the bottle openings 24² with pivoted spring seated pawls 24⁴ and 24⁵, which extend through openings in the plate, and project beyond the rear thereof, as shown in Figs. 3, 11, 13, 14 and 22 of the drawings. Upon the upward movement of the label picker carriage 24, the pawls 24⁴ which are located at the rear of the top of the same and which are in alinement with the catches 27³, engage the under side thereof and raising the same releases the paste applying rollers 27', which are forced downwardly by the tension of springs 26', permitting the roller to contact with the label picker 24³ and apply thereto a coating of adhesive. During the continued upward movement of the carriage 24, in which movement the label pickers 24³ are supplied with labels, in a hereinafter described manner, the pawls 24⁵ positioned near the bottom of the carriage 24 and which are alined with the short arms 27⁶, but are out of alinement with the pawls 27³—Fig. 22 of the drawings—engage the short arms 27⁶ carrying the adhesive applying rollers 27' and force the same upwardly away from the label pickers, which by this time have received sufficient adhesive, until the catches 27³ drop over the pins 27⁵ and retain the rollers in their elevated position. Upon the downward movement of the carriage 24, the pawls 24⁴ and 24⁵ being permitted to pivot upwardly, as in Fig. 14 of the drawings—will override their respective engaging members and permit the adhesive applying roller 27' to remain in an elevated position, as the label pickers at this time carry on their adhesive coated faces, labels which have been received in a manner hereinafter described.

The no bottle no label feed device is constructed in the following manner: Mounted above the upper side of the frame 1, slightly in advance of the upright arms 1', are horizontally extending arms 28, which are pivoted near their centers as at points 28' to the frame 1. The front ends 28² of the arms are preferably curved outwardly and project slightly over one of the track forming rails 8' into the path of the bottles as they are fed toward the labeling mechanism, as shown in Fig. 2 of the drawings. Pivotally mounted to the rear ends 28³ of the arms 28 and extending at right angles thereto through horizontal openings in the vertical arms 1' and which communicate with the front edges of the vertical slots 22', are keys 28⁴, which are provided at their outer ends with rearwardly extending lugs 28⁵. During the inward movement of the lugs 28⁵, caused by the passing of a bottle along the tracks 8' and contacting with the front end 28² of the arm 28, the lugs will engage vertically extending slots 23⁴ in the front edge of the slides 23 and limit the upward movement of the same. The lugs 28⁵ of the keys 28⁴ are normally held out of engagement with the slots 23⁴, by the action of coiled springs 28⁶ mounted around the pivot points 28'.

The arrangement, timing and operation of the respective parts of the machine are such that as a bottle, after being fed to the machine, is conveyed toward the labeling mechanism and contacts with the outer end 28² of the arm 28, which forces the lug 28⁵ and the key 28⁴ into the slot 23⁴ of the slide 23, that at this time the label picker carriage 24, carried by the slides 22 will have nearly completed its upward movement. The pawls 24⁴ will have released the adhesive applying rollers, allowing the label pickers to receive a coating from the same, the pawls 24⁵ will have restored the rollers to their elevated position, and the label pickers will be immediately in front of the label boxes 25 and 25'. At this time the lug 28⁵ projecting into the slot 23⁴ will contact with the lower edge of the same and stop the upward movement of the slide 23. The slides 23 which are provided with the forwardly curved slots 23² in which the pins 24' operate, being held stationary, and the slides 22 to which motion is directly transmitted being provided with the horizontal slots 22³, which carry the pins 24, continuing a slight upward movement, the pins 24' will be forced rearwardly in the horizontal slots 22³ by the action of the slots 23² thereon, and the adhesive coated label pickers will be forced against the back of the labels at the upper side of the label boxes 25 and 25'. As the bottle to be labeled passes the outer end of the arm 28, the same will be free to move on its pivot and the tension of the coiled springs will withdraw the keys 28⁵ from the slots 23⁴ of the arms 23 and the pressure of the coiled springs 23³ interposed between the underside of the cutouts 23' in the slides 23 and the top of the lugs 22² on the slides 22 will force the slides upwardly. From this construction it will be readily observed that the pins in the horizontal slots 22³, will, by the action of the curved slots 23² be forced to the front of the slots 22³ carrying the label pickers with the labels carried thereby away from the label boxes 25 and 25'.

Before the bottles to be labeled reach the point to where they are to receive the labels, the label picker carriage will have reached its lowermost point of movement with the labels to be applied to the bottles carried by the label pickers and extending across the bottle openings in the path of travel of the bottles, the neck labels near the top of the opening and the body labels near the center. When the label picker carriage reaches its lowermost point of movement, the carriage will remain in a stationary position for a short period, which rest is caused by the peculiar configuration of the cam slot 18', while the bottle is passed through the openings. From this construction it will be observed that the bottle will receive its label before the label picker carriage again starts on its upward movement. If there is no bottle conveyed toward the labeling mechanism, the arm 28² is not engaged and consequently the key 28⁵ is not thrown into engagement with the slot 23⁴ and the pins 24' of the label carriage are held by the action of the coiled springs 23³ in the bottom of the curved or offset slots 23², thus preventing the offset movement of the label pickers and no labels are obtained.

As the bottles to be labeled are conveyed through the openings 24² of the plate 24, they engage the label extending across the opening, as shown in the modification—Fig. 19 of the drawings—and as they continue to travel through the openings, the labels forced by the advancing bottle contact with flexible rubber wiper fingers 29, supported by uprights 30 attached to the frame of the machine immediately in the rear of the label picker carriage 24. As the bottle continues to travel through the openings 24, the label wipers 29 temporarily retain the label against the face of the bottle, smooth out the label and press the adhesively coated edges thereof to the face of the bottle, as shown by Fig. 10 and by the modification Fig. 20 of the drawings.

The bottle carriage 6 secured to the conveyer chains 5, herebefore referred to and more fully disclosed in Figs. 5, 6 and 7, comprises a plate 6', provided at one edge with an upstanding lip 6² adapted to engage the bottle near its base and convey the same to the shelf in rear of the machine. In order that a bottle may be supported in an upright position during its travel through the labeling mechanism, a substantially inverted U-shaped back or rest 6³ is provided, which is pivotally connected as at 6⁴ to the underside of the plate 6' by the arm 6⁵. The back is held in an upright position during its travel from the feeding mechanism to a point in rear of the labeling mechanism, by the rollers at the base of the back riding on the supporting tracks 31⁴ which are positioned in spaced relation below and slightly to one side of the tracks 8' and extend from a point slightly in advance of and below the driven shaft 3 to a point immediately in the rear of the label wipers 29 as shown in Fig. 5 of the drawings.

It will be observed that as the carriage travels around the sprocket wheel, as in Fig. 7 of the drawings, the supporting back having performed its function will be carried beyond the end of the track 31⁴ and forced by a spring to drop into a lowered position, as in Fig. 7 of the drawings, to clear the stationary table at the rear of the machine while the upstanding lip 6² deposits the bottle onto the table 1² or other suitable form of receiver for the labeled bottles. After the bottle is deposited onto the table and as the carriage starts on its return movement, the back 6³ drops to a downwardly extending vertical position in which position it remains until the rollers carried thereby enter the slots formed by the tracks 8' and 31⁴.

In order to provide a means whereby labels that are shorter than the diameter of the bottle may be applied to the same, a modified form of label picker, as disclosed in Figs. 18, 19 and 20 of the drawings, is used. In the modification, a label picker carriage 31 is provided, having a label picker formed in two vertical halves 31′, each provided at its meeting edge with the other half with an aperature 31² of the configuration of a half a bottle, and hinged at their opposite edges to the label picker carriage. In the modification the opening formed by the label pickers 31′ is preferably smaller than the bottle to be labeled, and as the bottle passes therethrough after having taken the label from the two halves, the two halves of the label picker give readily to the passage of the bottle and are returned to their normal position by the action of a spring 31³ at the hinge point of the label pickers and label picker carriage, as shown in Figs. 19 and 20 of the drawings. The halves 31′, hereinafter termed gates, are capable of horizontal swinging movement when a bottle is being labeled, and are also capable of vertical movement when it is desired to provide the same with a label, and the wipers 29 serve as the means for holding the label against the face of the bottle during the movement thereof and also for wiping the label onto the bottle as the bottle is carried between the said wipers. The labels in the boxes 25 and 25′ are advanced to the front of the same against the label retaining fingers 25², by a follower plate 25³, in the rear of the labels and which is adapted to be advanced toward the front of the box by the action of overlapping spring pressed arms 25⁴, pivoted at their inner ends to the rear of the receptacles at each side thereof, and provided at their outer ends with rollers engaging the follower plate at the opposite side of the receptacle from the pivot point as in Figs. 15 and 16 of the drawings.

To take up any slack in the conveyer chains 5, a tension device is provided and is adapted to operate on the conveyer chains 5 at a point on their return movement to the bootle feeding device between the drive and driven shafts, more clearly disclosed in Figs. 1 and 5 of the drawings. The tension device comprises suitable toothed chain engaging wheels 32 carried by a transverse shaft 32′ which is mounted to rotate in slidable bearings 32², mounted in vertical slots 32³ in each side of the frame 1. The bearings 32² are positioned between upper and lower coiled springs 32⁴ and 32⁵, the lower ones resting at the bottom of the slots 32³ and the upper ones positioned between the bearings, and adjustable vertically screw threaded blocks 32⁶ which are adapted to be raised and lowered by vertical extending screw threaded shafts 32⁷ fitting into the openings in the blocks and mounted to rotate in the frame 1 of the machine. The shafts 32⁷ are provided at their upper ends with operating handles or wheels 32⁸. From the above construction, it will be observed that the blocks 32⁶ are forced downwardly and the springs comprising the bearings 32² will also be forced downwardly but will at all times have yielding movement either upwardly or downwardly in the slots 32³.

While it has been stated that neck and body label boxes may be carried by the machine, it is to be understood that one or more label boxes may be carried so long as they are positioned within the path of movement of the label pickers, as some bottles require but one label, some two, and others even a greater number.

Having thus described the invention what we claim as new and desire to secure by Letters Patent is—

1. In an apparatus for labeling cylindrical or other shaped containers, the combination with a label holding receptacle, a conveyer for the container to be labeled, mechanism for imparting movement thereto, means including vertically movable gates hinged to swing horizontally for applying an adhesive to the foremost label exposed in said receptacle, and for removing the label from the receptacle and placing the same in the path of the propelled container, and fixed wipers within the path of the container and through which the container and label are carried.

2. In an apparatus for labeling cylindrical or other shaped containers, the combination with a conveyer for the container to be labeled, mechanism for imparting movement thereto, label holding receptacles, means for applying an adhesive to the foremost label exposed in said receptacles, said means being operatable by the propelled container to be labeled, means for placing the coated label in the path of the said propelled container, and devices for applying the label to the container.

3. In an apparatus for labeling cylindrical or other shaped containers, the combination with a conveyer for the containers to be labeled, mechanism for imparting movement thereto, label holding receptacles, vertically reciprocating means for applying an adhesive to the foremost label exposed in said receptacles and for placing the coated label in the path of the propelled container, including parallel gates hinged to swing horizontally, means for supplying said reciprocating means with an adhesive on its upward movement, and devices for applying the label to the container.

4. In an apparatus for labeling cylindrical or other shaped containers, the combination with a conveyer for the containers to be labeled, a reciprocating label picker, a label receptacle in the path of movement of said label picker, means for applying an adhesive to the label picker in its movement toward the label receptacle, means operated by the propelled container to be labeled for forcing the adhesively coated label picker into contact with the exposed face of the label in the label receptacle and removing the label therefrom, and means for positioning the label in the path of the propelled container and devices for wiping the label onto the container.

5. In an apparatus for labeling cylindrical or other shaped containers, the combination with a conveyer for the containers to be labeled, a reciprocating label picker, a label receptacle in the path of movement of said label picker, means for applying an adhesive to the label picker during its movement toward the label receptacle, means operatable by the container for forcing the adhesively coated label picker into contact with the exposed face of the label in the receptacle and removing the label therefrom, and means for positioning the label in the path of the propelled container.

6. In an apparatus for labeling cylindrical or other shaped containers, the combination with a conveyer for the containers to be labeled, a reciprocating label picker, a label receptacle in the path of movement of said label picker, an adhesive applying means for the label picker and normally out of engagement therewith, devices for throwing the adhesive applying means into engagement with the label picker at the beginning of its movement toward the label receptacles, devices for restoring the adhesive applying means to its normal position as the label picker has about completed its movement toward the label receptacles, means for forcing the adhesively coated label picker into contact with the exposed face of the label in the receptacle and removing the label therefrom, and means for positioning the adhesively coated label in the path of the container.

7. In an apparatus for labeling cylindrical or other shaped containers, the combination with a conveyer, container carriers on said conveyer, means for positioning the label in the path of the container to be labeled, devices for applying the label to the container, and a container feeding device, mechanism for moving said feeding device at various speeds in the direction of movement of the conveyer, said container carrier adapted to remove a container from the feeding device when the two are moving at approximately the same speed.

8. In an apparatus for labeling cylindrical or other shaped containers, the combination with a conveyer for the containers to be labeled, a label receptacle out of the path of movement of the containers, means including parallel vertically movable gates hinged to swing horizontally and operatable by the propelled container to be labeled for successively removing labels therefrom and positioning the same in the path of the propelled containers and fixed flexible wipers extending over the conveyer and between which the container and label are carried.

9. In an apparatus for labeling cylindrical or other shaped containers, the combination with a conveyer for the containers, of means including parallel spaced vertically movable gates hinged to swing horizontally and operatable by the propelled container to be labeled for placing an adhesively applied label within the path of the containers propelled by the carrier, and fixed wipers within the path of the container and through which the container and the label are carried.

10. The combination in a labeling machine, of a bottle carrier, means for operating the same, means for positioning a label in the path of travel of a bottle on said carrier, including parallel, vertically movable gates hinged to swing horizontally, means for operating the gates, means for supplying an adhesive to the gates on their upward movement, and means associated with said gates for wiping the label on the bottle as the latter is advanced by the carrier.

11. In a labeling machine, a bottle conveyer, means for rotating the same, means for positioning a label in the path of travel of a bottle on said conveyer, including parallel, vertically movable gates hinged to swing horizontally, means for reciprocating the gates, means for applying an adhesive to said gates on the upward movement thereof, means for delivering a label to said gates, and means associated with the gates for wiping the label on the bottle as it is advanced by said conveyer.

12. In a labeling machine, an endless conveyer, means for rotating the same, means for positioning the label in the path of travel of a bottle on said conveyer, including parallel, vertically movable gates hinged to swing horizontally, means for reciprocating the gates, means for delivering a label to said gates, controlled by the bottle to be labeled on said conveyer, and means for wiping the label on the bottle as it is advanced by said conveyer.

13. In a labeling machine, an endless conveyer, bottle holding means thereon, means for actuating said conveyer, parallel gates hinged to swing horizontally projecting toward each other over said conveyer, means for reciprocating said gates vertically, means for applying paste to the outer vertical faces of the gates on the upward movement thereof, and means controlled by the bottle to be labeled on said conveyer for delivering labels to the pasted faces of the gates.

14. In a labeling machine, an endless conveyer, bottle holding means thereon, means for rotating said conveyer, parallel gates hinged to swing horizontally projecting toward each other over said conveyers, means for reciprocating said gates vertically, means for applying paste to the outer vertical faces of the gates on the upward movement thereof, means controlled by the bottle to be labeled on said conveyer, for delivering labels to the pasted faces of the gates, said gates adapted to remain stationary in their lowermost position to dispose the label thereon in the path of travel of a bottle on the conveyer to allow the moving bottle to remove the label from the gates, and means for wiping the label on the bottle as the latter moves forward.

In testimony whereof we have signed our names to this specification in the presence of two subscribing witnesses.

GEO. L. BENDER.
JOHN G. RAPP.

Witnesses:
H. BESHORMAN,
GEO. W. BROOKS.